United States Patent
Nakajima et al.

(10) Patent No.: US 8,967,475 B2
(45) Date of Patent: Mar. 3, 2015

(54) MAGNETIC HEAD DEVICE

(75) Inventors: Shigeo Nakajima, Nagano (JP); Katsuhisa Higashi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 58 days.

(21) Appl. No.: 13/876,229

(22) PCT Filed: Mar. 28, 2012

(86) PCT No.: PCT/JP2012/058047
§ 371 (c)(1),
(2), (4) Date: Mar. 27, 2013

(87) PCT Pub. No.: WO2012/133476
PCT Pub. Date: Oct. 4, 2012

(65) Prior Publication Data
US 2013/0181052 A1    Jul. 18, 2013

(30) Foreign Application Priority Data
Mar. 31, 2011  (JP) .................. 2011-080885

(51) Int. Cl.
*G06K 7/08* (2006.01)
*G11B 5/008* (2006.01)
*G11B 5/09* (2006.01)

(52) U.S. Cl.
CPC .......... *G06K 7/082* (2013.01); *G11B 5/00808* (2013.01); *G11B 5/09* (2013.01); *G06K 7/084* (2013.01)
USPC .......................................... 235/449; 235/439

(58) Field of Classification Search
USPC ................ 235/449, 439; 360/46, 75
See application file for complete search history.

(56) References Cited

U.S. PATENT DOCUMENTS

| | | | | |
|---|---|---|---|---|
| 5,442,492 | A | * | 8/1995 | Cunningham et al. .......... 360/46 |
| 2003/0058561 | A1 | * | 3/2003 | Aoyagi et al. .................. 360/46 |
| 2009/0195909 | A1 | * | 8/2009 | Eleftheriou et al. ............ 360/75 |
| 2010/0027154 | A1 | * | 2/2010 | Sonoda .......................... 360/75 |

FOREIGN PATENT DOCUMENTS

| | | |
|---|---|---|
| JP | 3-12008 | 1/1991 |
| JP | 2001-209903 | 8/2001 |

OTHER PUBLICATIONS

International Search Report for PCT/JP2012/058047 dated Jul. 3, 2012.

* cited by examiner

*Primary Examiner* — Ahshik Kim
(74) *Attorney, Agent, or Firm* — Frommer Lawrence & Haug LLP

(57) ABSTRACT

A magnetic head device which suppresses output fluctuation even though the output changes in part of an output waveform from the magnetic head. The magnetic head device includes a magnetic head for reproducing information recorded in a magnetic information recording medium; an amplifier section for amplifying a reproduced signal that the magnetic head has reproduced, by using a gain; an A/D converter section for converting the reproduced signal that has been amplified, to a digital signal, by sampling the signal at predetermined intervals, in order to output the converted digital signal; a signal comparator section for comparing a digital signal output value with a predetermined output criterion value; and a gain control section for adjusting the gain in such a way as to make the output value closer to the output criterion value, in the case where the output value is either greater or smaller than the output criterion value.

5 Claims, 4 Drawing Sheets

MAGNETIC HEAD DEVICE

The present application claims priority from PCT Patent Application No. PCT/JP2012/058047 filed on Mar. 28, 2012, which claims priority from Japanese Patent Application No. JP 2011-080885, filed on Mar. 31, 2011, the disclosures of which are incorporated herein by reference in their entirety.

FIELD OF THE INVENTION

The present invention relates to a magnetic head device for reproducing magnetic information recorded in a magnetic information recording medium.

It is noted that citation or identification of any document in this application is not an admission that such document is available as prior art to the present invention.

For example, named as a magnetic recording medium for recording magnetic information are card media such as a credit card, a prepaid card, a cash card, and the like. In a magnetic stripe formed in such a card medium, magnetic information such as specific information and the like is recorded.

In order to record magnetic data into a card medium, used is, for example, an FM modulating method (F2F method) on the basis of a combination of two kinds of frequencies. For reproducing magnetic information recorded by way of such an FM modulating method, a magnetic head contacts a magnetic stripe of a card medium and slides thereon relatively in order to obtain the magnetic information as an analog signal, and then the analog signal is amplified by an AMP circuit, and converted by a demodulation circuit to a digital signal, which is taken into a CPU.

Known is a magnetic head device for reproducing magnetic information recorded in a card medium in which a gain adjustment of a head amplifier can automatically be made (for example, refer to Japanese Unexamined Patent Application Publication No. HEI03-12008 ("JP HEI03-12008").

In a magnetically-recorded information reproducing device (magnetic head device) described in JP HEI03-12008, a magnetic card is drawn in, after setting an initial gain at first. Then, the magnetic card stops, after an AD converter measures a card output. If the card output is greater than a specified standard value, the magnetically-recorded information reproducing device deducts '1' from a gain. In the case of a reverse situation, the magnetically-recorded information reproducing device adds '1' to the gain. Then, while moving the magnetic card again, the magnetic card reader reads out data, and stops the magnetic card, in such a way as to repeat the same process as described above. The magnetically-recorded information reproducing device repeats the process, until the card output becomes consistent with the specified standard value, in order to set a gain and read out the data of the magnetic card.

Unfortunately, in the case of the magnetically-recorded information reproducing device (magnetic head device) described in JP HEI03-12008, it is needed to repeatedly draw the magnetic card in until the card output becomes consistent with the specified standard value, so that it takes a lot of trouble before finally having set the gain.

Furthermore, the magnetically-recorded information reproducing device described in JP HEI03-12008 uses a standard card for setting the gain; and therefore, it cannot handle problems of output variation of each magnetic card, a lowered output due to wear of the magnetic head, and output fluctuation due to a changing card transfer speed and the like; so that, unfortunately there exists a problem that a reading error may happen.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicants) reserve the eight to disclaim, and hereby disclose a disclaimer of, any previously described product, method of making the product, or process of using the product.

SUMMARY OF THE INVENTION

Then, it is an objective of the present invention to provide a magnetic head device that can suppress output fluctuation even though the output changes in part of an output waveform from the magnetic head.

To achieve the objective described above, the present invention provides the following aspects.

(1) A magnetic head device including: a magnetic head for reproducing information recorded in a magnetic information recording medium; an amplifier section for amplifying a reproduced signal with a gain, the reproduced signal being reproduced by the magnetic head; an A/D converter section that carries out sampling at predetermined intervals with respect to the amplified reproduced signal for converting into a digital signal and outputs the digital signal; a signal comparator section for comparing an output value of the digital signal with a predetermined output criterion value; and a gain control section for adjusting the gain in such a way as to make the output value closer to the output criterion value in the case where the output value is either smaller or greater than the output criterion value.

According to the present invention, the sampled signal obtained by way of sampling at predetermined intervals, with respect to the reproduced signal amplified by the amplifier section, is converted into the digital signal; and the output value, of the digital signal is compared to the predetermined output criterion value. Then, by means of adjusting the gain in such a way as to make the output value closet to the output criterion value in the case where the output value is either smaller or greater than the output criterion value, one-time drawing-in of the magnetic information recording medium completes the gain setting work; and therefore, being compared to conventional technologies, it is possible to simply set the gain.

Furthermore, in the magnetic head device according to the present invention, the output value is compared to the output criterion value by making use of the sampling by the A/D converter section that converts the reproduced signal into the digital signal, in order to adjust the gain at each time of sampling. Therefore, even though the output changes in part of an output waveform, output fluctuation can be suppressed by way of controlling the gain by following the change in the output so that it is possible to improve a performance for reading information recorded in the magnetic information recording medium.

(2) The magnetic head device; wherein the gain control section adjusts the gain in such a way as to make the output value closer to the output criterion value, with a certain rate in proportion to an output difference between the output value and the output criterion value.

According to the present invention, the gain is not adjusted in such a way as to cancel all the output difference through one-time sampling, but the gain is adjusted step by step through several times of sampling while being adjusted with a certain rate in proportion to the output difference. Namely, the gain can be changed at the certain rate. Therefore, since the amplified output waveform, changes smoothly, an output waveform with a stable amplitude can be obtained.

(3) The magnetic head device; wherein the gain control section adjusts the gain in such a way as to make the output value closer to the output criterion value, with a rate of 35 to 60% in proportion to the output difference between the output value and the output criterion value.

According to the present invention, the gain can properly be adjusted by way of several times of sampling in such a way as to change the gain with a certain rate. Therefore, the waveform of the amplified output changes smoothly so that it is possible to avoid a reading error.

(4) The magnetic head device; wherein the signal comparator section compares the output value of the digital signal with the predetermined output criterion value, at each time of sampling.

According to the present invention, the gain can be adjusted at each time of sampling, and therefore, the output fluctuation can be suppressed by way of adjusting (controlling) the gain by following the change in output, even though the output changes in part of the output waveform. As a result, it is possible to further improve the performance for reading information recorded in the magnetic information recording medium.

(5) The magnetic head device; wherein the magnetic head device is equipped with a storage section for storing the digital signal; and the signal comparator section compares the output value of the digital signal, stored in the storage section, with the output criterion value.

According to the present invention, after taking in all digital signals, obtained by way of A/D conversion of the reproduced signal, into the storage section, a variable gain can be adjusted by making a comparison between output values of the digital signals with the output criterion value.

(6) A magnetic card reader including the above-described magnetic head device.

According to the present invention, the magnetic card reader controls output variation of each magnetic card, a lowered output due to wear of the magnetic head, and output fluctuation due to a changing transfer speed, and the like, of the magnetic card, so that it can avoid a reading error of the magnetic card.

The magnetic head device according to the present invention is able to adjust a gain at each time of sampling, and therefore the output fluctuation can be suppressed by way of adjusting (controlling) the gain by following the change in output, even though the output from the magnetic head changes. As a result, the reading performance can be improved.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable, for implementing the present invention. However, because such elements ate well known in the art, and because they do not facilitate a better understanding of the present invention, a discussion of such elements is not provided herein.

The present invention will now be described in detail on the basis of exemplary embodiments.

For a magnetic card reader equipped with a magnetic head device, popularly known is an FM modulating method in which a binary data signal composed of "0" or "1" is stored by a combination of two types of frequencies, namely "F" and "2F." At the time of reproducing magnetic information recorded by means of the FM modulating method, a magnetic head contacts a magnetic stripe of a card medium and slides thereon relatively in order to reproduce the magnetic information in a format of an analog signal, and obtain the magnetic information as an analog signal; and then the analog signal is amplified by an AMP circuit, and converted by a demodulation circuit to a digital signal in order for demodulating the binary data signal.

A best mode for carrying out the present invention is described below with reference to the accompanying drawings.

Figure 1A:
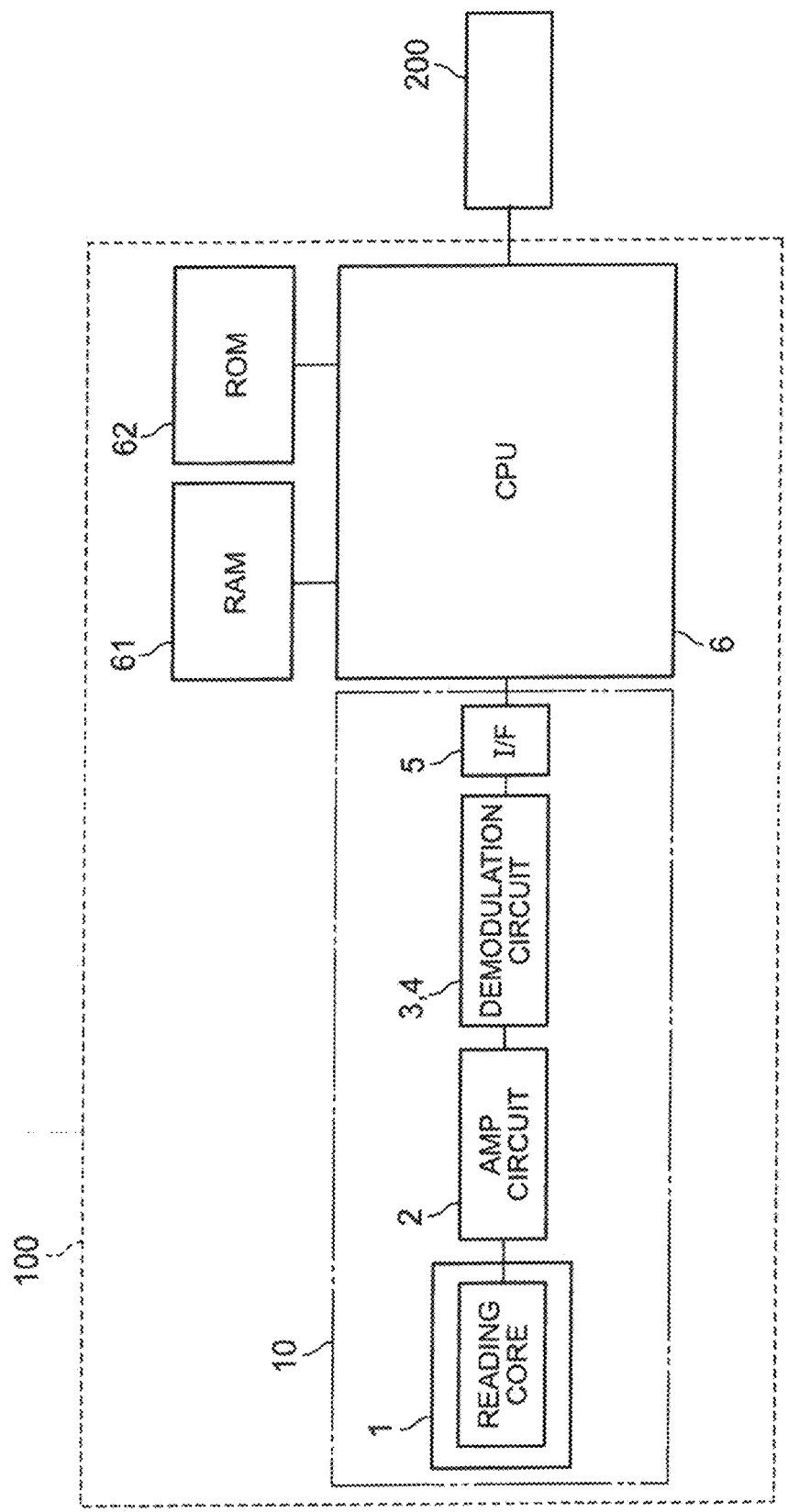
FIG. 1A is a block diagram showing a control system of a magnetic card reader equipped with a magnetic head device according to an embodiment of the present invention.
Figure 1B:
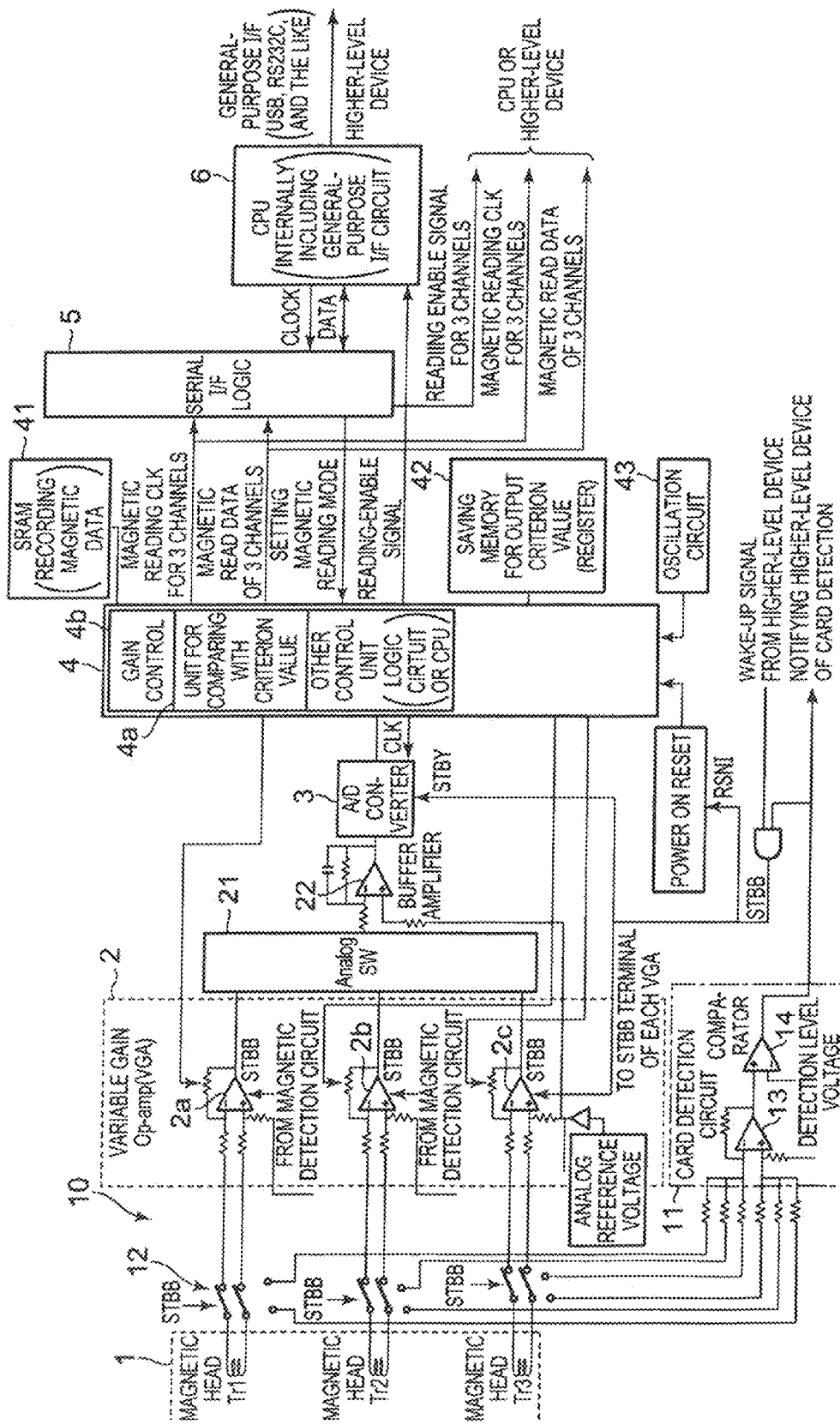
FIG. 1B is a block diagram showing a working example of the magnetic head device according to the present invention.

Configuration of Control System of Magnetic Card Reader:

FIG. 1A is a block diagram showing a control system of a magnetic card reader equipped with a magnetic head device according to an embodiment of the present invention. FIG. 1B is a block diagram showing a working example of a magnetic head device 10 according to the embodiment of the present invention.

In FIG. 1A, a control system 100 of the magnetic card reader equipped with the magnetic head device 10 according to the embodiment of the present invention mainly includes the magnetic head device 10, and a CPU 6, a RAM 61, and a ROM 62 as a circuit for controlling a whole section of the magnetic card reader including the magnetic head device 10. The CPU 6 works as a control center for the whole section of the magnetic card reader; and namely conducts an integral control for the magnetic card reader including the magnetic head device 10. The ROM 62 stores a basic program and so on, for the magnetic card reader to read out magnetic information recorded in a card medium, and to record magnetic information into a magnetic recording medium. In the mean time, the RAM 61 functions as a working area for the CPU 6. Incidentally, the RAM 61 and/or the ROM 62 may be built in a CPU 31 (such as a built-in ROM).

Furthermore, the control system 100 of the magnetic card reader communicates with, a higher-level device 200 such as a host computer, by way of a communication interface (not shown) such as RS232C.

Configuration of Magnetic Head Device:

As shown in FIG. 1A and FIG. 1B, the magnetic head device 10 includes a magnetic head 1, an AMP circuit and a demodulation circuit, both the above being configured as circuits for processing a magnetic signal output from the magnetic head 1, and a communication interface 5 for transmitting a processed signal to the CPU 6. An analog signal reproduced by the magnetic head 1 is amplified and waveform-shaped by the AMP (amplifier) circuit 2. Then, after being demodulated by demodulation circuits 3 and 4 (namely, after binarization, i.e., A/D conversion, and the like on the signal read out), the signal is transmitted to the CPU 6. Incidentally, the demodulation circuits 3 and 4 for A/D conversion may be built in the CPU 6. Furthermore, the CPU 6 communicates with the higher-level device 200 by way of a communication interface such as RS232C.

Next, a practical configuration of the magnetic head device 10 is explained with reference to FIG. 1B. The magnetic head device 10 includes the magnetic head 1 for reproducing information recorded in a card medium as a magnetic information recording medium; an amplifier section 2 for amplifying a reproduced signal that the magnetic head 1 has reproduced, by using a variable gain; an A/D converter section 3 for converting the reproduced signal that has been amplified, to a digital signal, by way of sampling the signal at predetermined intervals, in order to output the converted digital signal; a signal comparator section 4a for comparing a digital signal output value with a predetermined output criterion value; and a gain control section 4b for adjusting the variable gain in such a way as to make the output value closer to the output criterion value, in the case where the output value is either greater or smaller than the output criterion value. In other words, the amplifier section 2 corresponds to the AMP circuit 3 shown in FIG. 1, and the demodulation circuits correspond to the A/D converter section 3 and a control section 4.

As FIG. 1B shows, in the present embodiment, the magnetic head 1 is called "3-channel magnetic head," including a magnetic head Tr1, a magnetic head Tr2, and a magnetic head Tr3. Concretely to describe, a magnetic stripe having information recorded on it is formed on the card medium and three lines of magnetic tracks, being split, are formed in the magnetic stripe, while there are placed the separate magnetic heads Tr1, Tr2, and Tr3 that individually correspond to each of the split magnetic track positions. Accordingly, the three magnetic tracks formed in the magnetic stripe reproduce information individually recorded by using each of the magnetic heads Tr1, Tr2, and Tr3.

The amplifier section 2 amplifies the reproduced signal that the magnetic head 1 has reproduced, with the variable gain. Concretely to describe, the amplifier section 2 includes an operational amplifier 2a using a variable gain for amplifying a reproduced signal that the magnetic head Tr1 has reproduced, an operational amplifier 2b using a variable gain for amplifying a reproduced signal that the magnetic head Tr2 has reproduced, and an operational amplifier 2c using a variable gain for amplifying a reproduced signal that the magnetic head Tr3 has reproduced.

In the present embodiment, the magnetic head 1 is provided with a card detection circuit 11 for detecting a card, medium that has been drawn in, by way of a selector switch 12.

The card detection circuit 11 outputs a card detection signal and sends the signal to the higher-level device, when an analog signal exceeds a specified threshold, the analog signal being generated out of the magnetic head 1 at the time of drawing in the card medium. Then, the higher-level device transmits a wake-up signal to the magnetic head device 10 at the time when it receives the card detection signal.

The selector switch 12 switches the status of the magnetic head device 10 from a standby condition to a working condition, at the time of receiving the wake-up signal from the higher-level device.

Under a standby condition, the magnetic head device 10 keeps the position of the selector switch 12 of each track to a side of the card detection circuit 11. Then, at the time of receiving the wake-up signal from the higher-level device, the magnetic head device 10 switches the position of the selector switch 12 of each track to a side of the amplifier section 2 (working condition).

Incidentally, applied may be a configuration in which the magnetic head device 10 switches the selector switch 12 into a working condition, only according to the card detection signal corning from the card detection circuit 11, without waiting for the wake-up signal from the higher-level device.

While carrying out sampling operation with respect to an analog signal by using a sufficiently fast clock, the A/D converter section 3 converts sampled data of the analog signal into a digital value, and outputs it as a digital signal.

Selecting one magnetic head out of the magnetic heads Tr1, Tr2, and Tr3, an analog switch 21 introduces an analog signal reproduced by the selected magnetic head, into the A/D converter section 3.

A reference numeral "22" represents a buffer amplifier, which controls noise on the analog signal introduced into the A/D converter section 3.

In FIG. 1B, a reference numeral "4" represents the control section configured with a CPU or a logic circuit, and the control section includes the signal comparator section 4a, the gain control section 4b, and other control units. The control section 4 includes an oscillation circuit 43, and generates a clock for converting an analog signal to a digital signal in the A/D converter section 3. Furthermore, the control section 4 includes a first storage section 41 and a second storage section 42. The first storage section 41 is a storage unit of an SRAM and the like, for storing the digital signal converted by the A/D converter section 3. The second storage section 42 is a storage unit of a register and the like, for storing an output criterion value specified beforehand. Incidentally, the output criterion value is not restricted only to a preset value, but may be a value to be specified at each time of reading.

The signal comparator section 4a compares an output value of the digital signal with the predetermined output criterion value, at each time of sampling. Incidentally, the signal comparator section 4a may be so configured as to compare the output value with the output criterion value once in several samplings, or to compare only a peak output value with the output criterion value. Furthermore, the signal comparator section 4a may be so configured as to compare output values stored in the first storage section 41 with the output criterion value, after taking in all digital signals converted by the A/D converter section 3 into the first storage section 41.

When receiving a wake-up signal from the higher-level device 200, the gain control section 4b sets a gain, for each of the operational amplifiers 2a, 2b, and 2c constituting the amplifier section 2, with an initial value; and then makes an adjustment with respect to the gain at each sampling time. The gain control section 4b decreases the gain set with the initial value if the output value is greater than the output criterion value, or increases the gain set with the initial value if the output value is smaller than the output criterion value, in such a way as to make the output value equal to the output criterion value. For each of the operational amplifiers 2a, 2b, and 2c in the amplifier section 2, the setting condition of the variable gain is updated at a next operational clock, and then an analog signal is amplified by using the updated gain.

In the present embodiment, the gain is calculated and adjusted as described below:

For example, in the case where an output value 'A' at the time is smaller than an output criterion value 'B', a temporarily adjusted output value 'A0' is calculated according to a calculation of "the output value 'A'×α=A0". Next, a difference between the temporarily adjusted output value 'A0' and the output criterion value 'B' is calculated, and then a new gain α' is obtained by calculation according to the difference, in such a way that the output value becomes closer to the output criterion value 'B'.

The new gain α' works as a gain at the time of calculating a temporarily-adjusted output value with respect to an output value that is output at a next sampling time.

Described below is a reason why the new variable gain α' is used for making the output value closer to the output criterion value 'B':

At the time of adjusting the gain, if an adjustment for the gain is made by way of one-time sampling in order to cancel all the output difference, namely to make the output value consistent with the output criterion value 'B'; unfavorably, a step is likely to appear in an output waveform that is output at a next sampling time. Therefore, the gain is adjusted in such a way as to gradually make the output value closer to the output criterion value with a certain rate, for example, within a range from 35 to 65% of the output difference. In this way, being free from effect of noise, an output waveform with a certain amplitude can be obtained. In the gain control section 4b of the present embodiment, the gain is increased and decreased with a rate value equivalent to 50% of the output difference. Thus, the gain control section 4b adjusts the gain with a certain rate in proportion to the output difference between the output value of the digital signal and the predetermined output criterion value.

Figure 2:
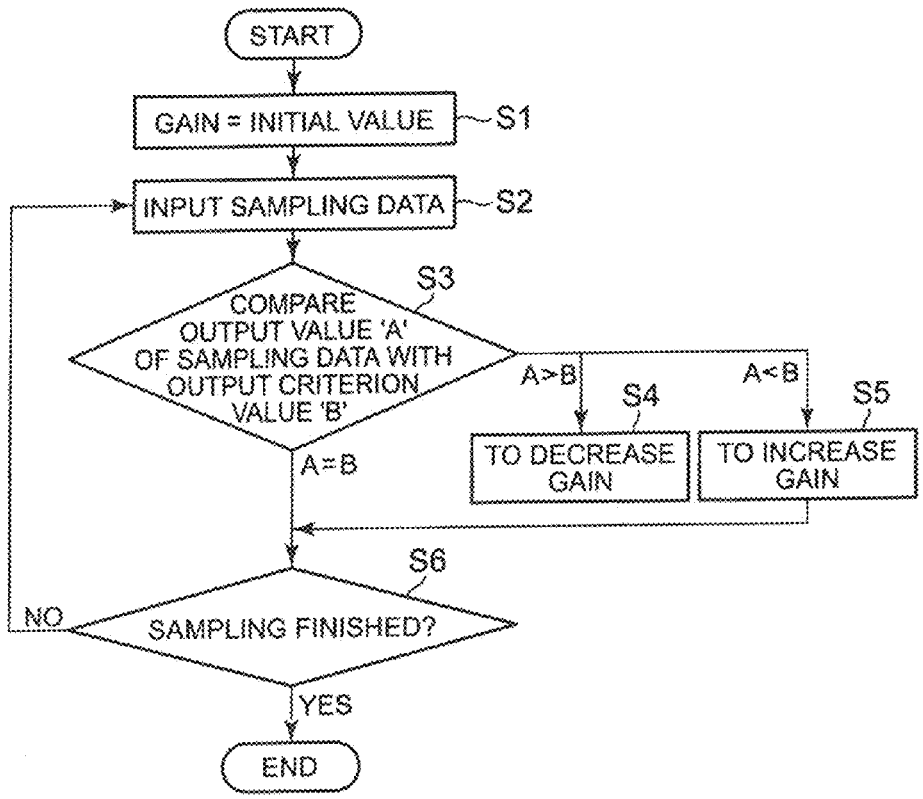
FIG. 2 is a flowchart showing a working example of the magnetic head device according to the present invention.
Figure 3:
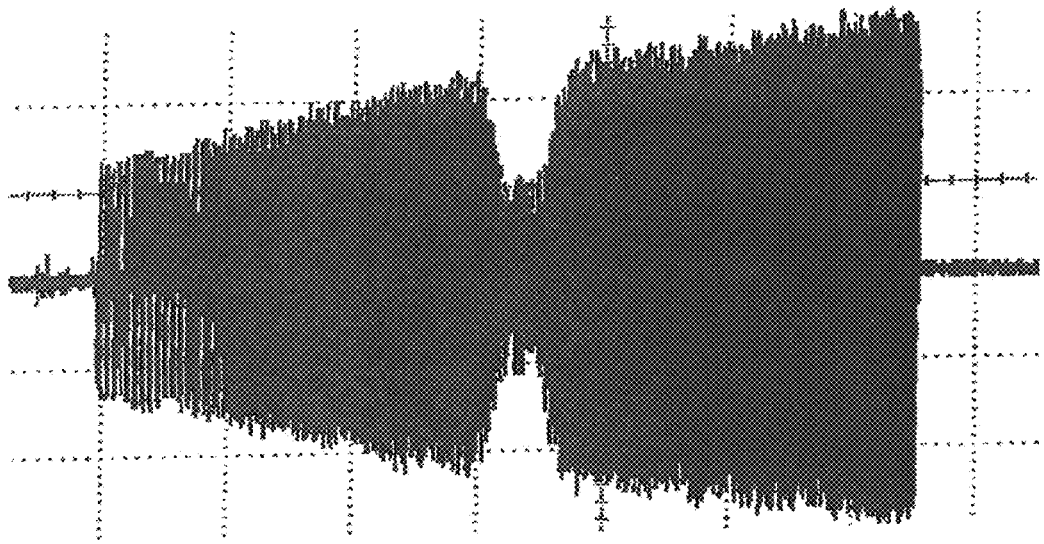
FIG. 3 is a drawing of an output waveform in the case where no gain adjustment is made.
Figure 4:
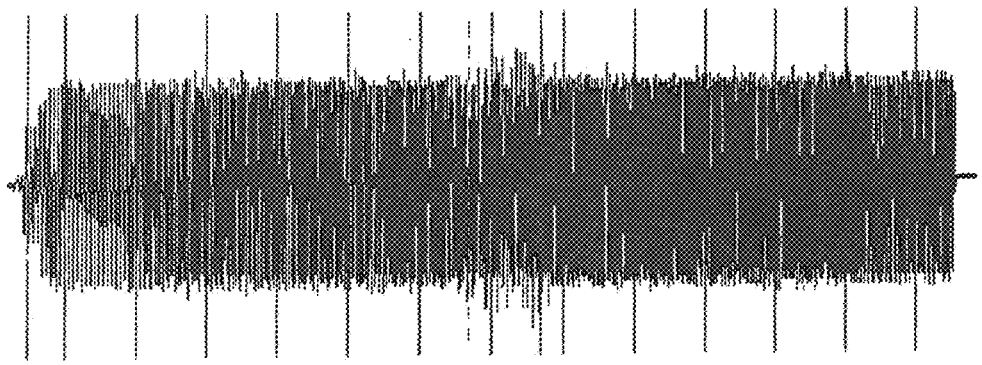
FIG. 4 is a drawing of an output waveform in the case where a gain adjustment has been made.

Method of Reproducing Magnetically-Recorded Information:

FIG. 2 is a flowchart showing a working example of the magnetic head device according to the present invention, and the flowchart represents procedures of the gain adjustment.

For a magnetic head device applicable to a magnetic card reader, popularly known is an FM modulating method in which a binary data signal composed of "0" or "1" is stored by a combination of two types of frequencies, namely "F" and "2F." At the time of reproducing magnetic information recorded by means of the FM modulating method, a magnetic head contacts a magnetic stripe of a card medium and slides thereon relatively in order to reproduce the magnetic information in a format of an analog signal, and obtain the magnetic information as an analog signal; and then the analog signal is amplified by an AMP circuit, and converted by a demodulation circuit to a digital signal in order for demodulating the binary data signal.

As described above, at the time of recording magnetic information into a card medium, used is, for example, an FM modulating method (F2F method) oil the basis of a combination of two kinds of frequencies. For reproducing magnetic information recorded by way of such an FM modulating method, the magnetic head 1 contacts a magnetic stripe of a card medium and slides thereon relatively in order to obtain the magnetic information, as an analog signal, and then the analog signal is amplified by the AMP circuit 2, and converted by demodulation circuits 3 and 4 to a digital signal, which is taken into the CPU 6.

Having drawn in the card medium, the magnetic head device 10 outputs the analog signal from the magnetic head 1. If the analog signal exceeds a specified threshold, the card detection circuit 11 outputs a card detection signal and sends the signal to the higher-level device 200. The higher-level device 200 transmits a wake-up signal to the CPU 6 of the magnetic card reader at the time when it receives the card detection signal. The CPU 6 switches the status of the selector switch 12 from a standby condition to a working condition, at the time of receiving the wake-up signal from the higher-level device 200.

The analog signal reproduced by the magnetic head 1 is amplified in the amplifier section 2 including the operational amplifier 2a, 2b, and 2c for which a gain has initially been set with an initial value (S1).

Then, carrying out sampling operation with respect to the analog signal by using a sufficiently fast clock, the A/D converter section 3 converts sampled data of the analog signal into a digital value, and outputs it (S2).

In the case where the magnetic head 1 is equipped with a plurality of magnetic heads Tr1 through Tr3, the magnetic card reader 10 selects one magnetic head out of them by using the analog switch 21, and takes in an analog signal reproduced by the selected magnetic head, into the A/D converter section 3.

The signal comparator section 4a compares an output value 'A' (digital value) of the sampled data from the A/D converter section 3 with an output criterion value 'B' set beforehand in the storage section 42, at each time of sampling (S3).

The gain control section 4b decreases the gain set with the initial value if the output value 'A' is greater than the output criterion value 'B' (A>'B'), or increases the gain set with the initial value if the output value 'A' is smaller than the output criterion value 'B' (A<B), in such a way as to make the output value 'A' equal to the output criterion value 'B' (S4 and S5).

In the magnetic head device 10 according to the present invention, the gain is not adjusted in such a way as to cancel all the output difference between the output value 'A' and the output criterion value 'B', namely |A–'B'|, but the gain is increased and decreased with a rate value equivalent to a certain rate (for example, 50%) in proportion to the output difference, |A–B|. In this way, the gain does not change so quickly in the magnetic head device 10, even if the difference between the output value 'A' and the output criterion value 'B' is great. Therefore, it is possible to prevent a reading error from happening due to a step caused in an output waveform.

Steps from S2 through S5 are carried out until the sampling operation finishes (S6). The comparison between the output value 'A' and the output criterion value 'B' as well as the gain adjustment, among the series of operation steps, may be carried out, after taking in all digital signals converted by the A/D converter section 3 into the first storage section 41.

Method of Demodulating Magnetically-Recorded Information:

In the magnetic head device 10, the control section 4 detects peaks (including an apex and a trough) of a waveform, out of a digital signal amplified by the amplifier section 2 and A/D-converted by the A/D converter section 3. Furthermore, the control section 4 measures an interval between the peaks on the basis of the detected peak positions, and determines it to be "0" or "1" if the interval (distance) exceeds, or does not exceed a threshold specified according to a standard interval, respectively. Each digital signal determined is transmitted to the CPU 6 through the interface (serial I/F logical) 5.

In the case of a motor-activated magnetic card reader in which a card medium is transferred at a constant speed by a motor, the threshold is a constant value according to a magnetic recording density and a card transfer speed. Meanwhile, in the case of a hand-operated magnetic card reader in which a card medium, is manually handled, the threshold is specified according to past interval data.

The magnetic head device 10 executes the series of operation steps described above with respect to all data taken in, and transmits the read result from the control section 4 to the CPU 6 (or, the higher-level device 200), on the basis of a read clock, a read data signal, and a read enable signal. The read clock is a signal that shows the timing for reading the read data; the read data signal is digital magnetic information expressed with "0" and "1"; and the read enable signal is a signal for notifying the CPU 6 (or, the higher-level device 200) that it is enabled to read the magnetic information. The CPU 6 takes in the read, data when the read enable signal is ON. The read clock, the read data signal, and the read enable signal may be directly transmitted to the higher-level device 200; and the read data signal may be transmitted to the higher-level device 200, while being introduced to the CPU 6 and the like internally including a general-purpose I/F (USB, and RS232C), byway of the serial I/F logic 5. In the case where the CPU 6 is used, the magnetic head device 10 is able to set up an operation mode for magnetically reading (changing a signal polarity, changing a threshold for peak detection, and so on), from the higher-level device 200.

Primary Advantageous Effect of the Present Embodiment

As described above, the magnetic head device 10 Is able to adjust the gain by way of drawing in the magnetic recording medium just one time. Therefore, being compared to conventional technologies, the magnetic head device 10 can simply adjust the gain. Furthermore, since the magnetic head device 10 can adjust the gain at each time of sampling, the device can suppress output fluctuation even though the output changes in part of an output waveform, by way of controlling the gain, by following the change in the output so that the reading performance can be improved.

Other Embodiments:

After taking in information recorded in the magnetic card, the magnetic head device 10 changes the selector switch 12 to return into standby condition in order to get into an energy-saving status. To always enable the higher-level device to refer to magnetic data, the communication circuit between the higher-level and the magnetic head device 10, as well as the memory storing magnetic data are kept in working condition at any time.

Furthermore, by way of encrypting and transmitting data for transmission to the higher-level device, the magnetic head device 10 can improve security performance. In the magnetic head device 10, if a downsized circuit component is used as a constituent element, and a circuit board is embedded in the magnetic head 1 and sealed with a resin material, it becomes impossible for a probe to measure a signal of the circuit, and therefore magnetic data is kept from illegal acquisition. In the magnetic head device 10, the threshold for peak detection (slice level) may be variable according to an output level.

The signal comparator section may be so configured as to compare an output value with an output criterion value at each time of sampling, being with respect to each sampling by the A/D converter section, or may as well be so configured as to compare an output value with an output criterion value once in several samplings.

The predetermined output criterion value is not limited to what has been set beforehand in the memory, but may be set at each time of reading data.

Industrial Applicability

The magnetic head device according to the present invention is useful since it can avoid a reading error of a magnetic information recording medium, while controlling output variation of each magnetic information recording medium, a lowered output due to wear of the magnetic head, and output fluctuation due to a changing transfer speed, and the like, of the magnetic information recording medium.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

Reference Numerals

1. Magnetic head
2. Amplifier section
3. A/D converter section
4. Control section
4a. Signal comparator section
4b. Gain control section
5. General-purpose I/F
6. CPU
10. Magnetic head device
11. Card detection circuit
12. Selector switch
21. Analog switch
22. Buffer amplifier
41. SRAM
42. Storage section
43. Oscillation circuit

What is claimed is:

1. A magnetic head device comprising:
   a magnetic head for reproducing configured to reproduce information recorded in a magnetic information recording medium;
   an amplifier section for amplifying configured to amplify a reproduced signal with a gain, the reproduced signal being reproduced by the magnetic head;
   an A/D converter section that carries out sampling at predetermined intervals with respect to the amplified reproduced signal for converting into a digital signal and outputs the digital signal;
   a signal comparator section for comparing configured to compare an output value of the digital signal with a predetermined output criterion value; and
   a gain control section for adjusting configured to adjust the gain in such a way so as to make the output value closer to the output criterion value in the a case where the output value is either smaller or greater than the output criterion value;
   wherein the rain control section adjusts the rain in such a way as to make the output value closer to the output criterion value, with a rate of 35 to 60% in proportion to the output difference between the output value and the output criterion value.

2. The magnetic head device according to claim 1, wherein the signal comparator section compares the output value of the digital signal with the predetermined output criterion value, at each time of sampling.

3. The magnetic head device according to claim 1, wherein the gain control section adjusts the gain in such a way as to make the output value closer to the output criterion value, with a rate of 50% in proportion to the output difference between the output value and the output criterion value.

4. The magnetic head device according to claim 1 claim 2, or claim 3,
   wherein the magnetic head device is equipped with a storage section for storing configured to store the digital signal; and
   wherein the signal comparator section compares the output value of the digital signal, stored in the storage section, with the output criterion value.

5. A magnetic card reader comprising:
   the magnetic head device according to claim 1, claim 2, claim 4, or claim 3.

* * * * *